(12) United States Patent
Kato

(10) Patent No.: US 11,906,991 B2
(45) Date of Patent: Feb. 20, 2024

(54) ELECTRONIC DEVICE

(71) Applicant: CASIO COMPUTER CO., LTD., Tokyo (JP)

(72) Inventor: Koichi Kato, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/940,469

(22) Filed: Sep. 8, 2022

(65) Prior Publication Data

US 2023/0071092 A1 Mar. 9, 2023

(30) Foreign Application Priority Data

Sep. 9, 2021 (JP) ................. 2021-146713

(51) Int. Cl.
*H04B 10/69* (2013.01)
*G05F 1/46* (2006.01)

(52) U.S. Cl.
CPC ............. *G05F 1/46* (2013.01); *H04B 10/693* (2013.01)

(58) Field of Classification Search
None
See application file for complete search history.

(56) References Cited

U.S. PATENT DOCUMENTS

| | | | |
|---|---|---|---|
| 7,085,114 B2 * | 8/2006 | Feast | G01R 19/14 361/84 |
| 7,308,519 B2 * | 12/2007 | Dandy | H04L 12/40032 702/116 |
| 8,242,742 B2 * | 8/2012 | Kao | H02J 7/0013 320/155 |
| 11,119,971 B1 * | 9/2021 | Singh | G06F 13/4282 |
| 11,451,076 B2 * | 9/2022 | Broders | H02J 7/00034 |
| 2011/0268451 A1 * | 11/2011 | Groepl | H04B 10/25751 398/116 |
| 2020/0209942 A1 * | 7/2020 | Morita | H04N 21/44231 |
| 2022/0291868 A1 * | 9/2022 | Kimura | G11C 7/1051 |
| 2022/0337318 A1 * | 10/2022 | Bai | H04B 10/693 |

FOREIGN PATENT DOCUMENTS

JP 2011-164943 A 8/2011

* cited by examiner

*Primary Examiner* — Thomas J. Hiltunen

(74) *Attorney, Agent, or Firm* — Scully, Scott, Murphy & Presser, P.C.

(57) ABSTRACT

An electronic device includes first and second connecting wires to which first and second signal wires are connectable, respectively, and a first resistor. The first signal wire transmits a first signal between the electronic device and an external device. The second signal wire transmits a second signal from the external device to the electronic device. The first resistor is disposed between the first connecting wire and a power source of the electronic device. A resistance value of the first resistor is set such that an output voltage from the second connecting wire is lower than a reference value when a voltage of the power source is input to the second connecting wire via the first connecting wire and the external device in a state in which the first and second signal wires are electrically connected to one another and the second signal is not input to the second signal wire.

22 Claims, 2 Drawing Sheets

ELECTRONIC DEVICE

CROSS-REFERENCE TO RELATED APPLICATIONS

This application is based upon and claims the benefit of priority from Japanese Patent Application No. 2021-146713 filed on Sep. 9, 2021, the entire content of which is incorporated herein by reference.

BACKGROUND

Technical Field

The present disclosure relates to an electronic device.

Description of Related Art

As an electronic device that operates by receiving a data signal from the outside, there is an electronic device that operates or starts by receiving, together with a data signal, power from the outside via a cable. This type of electronic device can determine whether power is input, by detecting and comparing an input voltage with a reference voltage.

There are cables each containing multiple independent signal wires. The signal wires of a cable may not be independent at an electronic device to which the cable is connected, and may be connected to one another to perform a process. Hence, the signal wires of a cable connected to an electronic device could transmit a voltage applied to one of the signal wires to the other(s), for example, while the electronic device does not perform the process and stops operating. In JP 2011-164943 A, there is disclosed a technique provided with a circuit to prevent malfunction of an AV amplifier in a power-off state resulting from power supply in a display device conveyed to the AV amplifier to which the display device is connected via an HDMI® cable.

One of the advantages of the present disclosure is that occurrence of malfunction of an electronic device due to signal wires connected thereto can be reduced.

SUMMARY

An electronic device includes:
a first connecting wire to which a first signal wire is connectable, the first signal wire transmitting a first signal between the electronic device and an external device;
a first resistor disposed between the first connecting wire and a power source of the electronic device; and
a second connecting wire to which a second signal wire is connectable, the second signal wire transmitting a second signal from the external device to the electronic device,
wherein a resistance value of the first resistor is set such that an output voltage from the second connecting wire is lower than a reference value when a voltage of the power source is input to the second connecting wire via the first connecting wire and the external device in a state in which the first signal wire and the second signal wire are electrically connected to one another and the second signal is not input to the second signal wire from the external device.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

Figure 1:
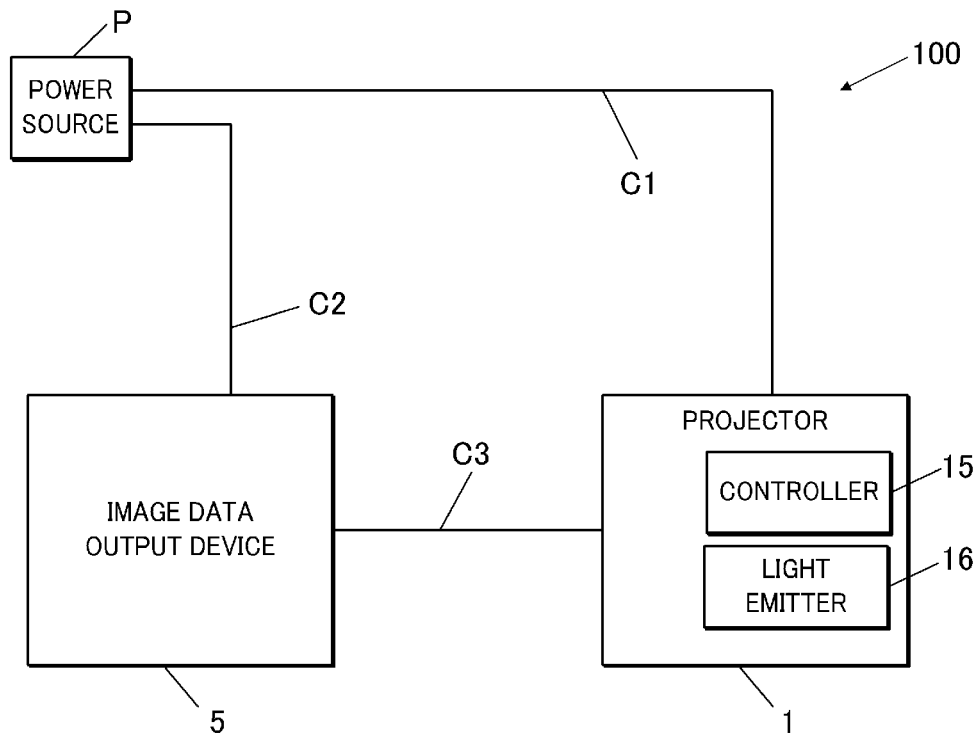
FIG. 1 is an illustration to explain the configuration of an image output system including a projector.

Hereinafter, an embodiment(s) of the present disclosure will be described with reference to the drawings. FIG. 1 is an illustration to explain the configuration of an image output system 100 that includes a projector 1 as an electronic device of this embodiment.

The image output system 100 includes the projector 1 and an image data output device 5 (external device). The projector 1 and the image data output device 5 operate by receiving power from an external power source P via power supply cables C1, C2, respectively.

The image data output device 5 is a device that outputs image data (which may include image data of moving images) to be displayed, such as a PC (Personal Computer), a TV recording/reproducing device or a video camera.

The projector 1 includes a controller 15 and a light emitter 16, and causes the light emitter 16 under the control of the controller 15 to emit an image based on input image data, thereby projecting the image onto a screen or a wall surface, where objects are projected. The image data output device 5 and the projector 1 are connected to one another by an HDMI® cable C3.

Figure 2:
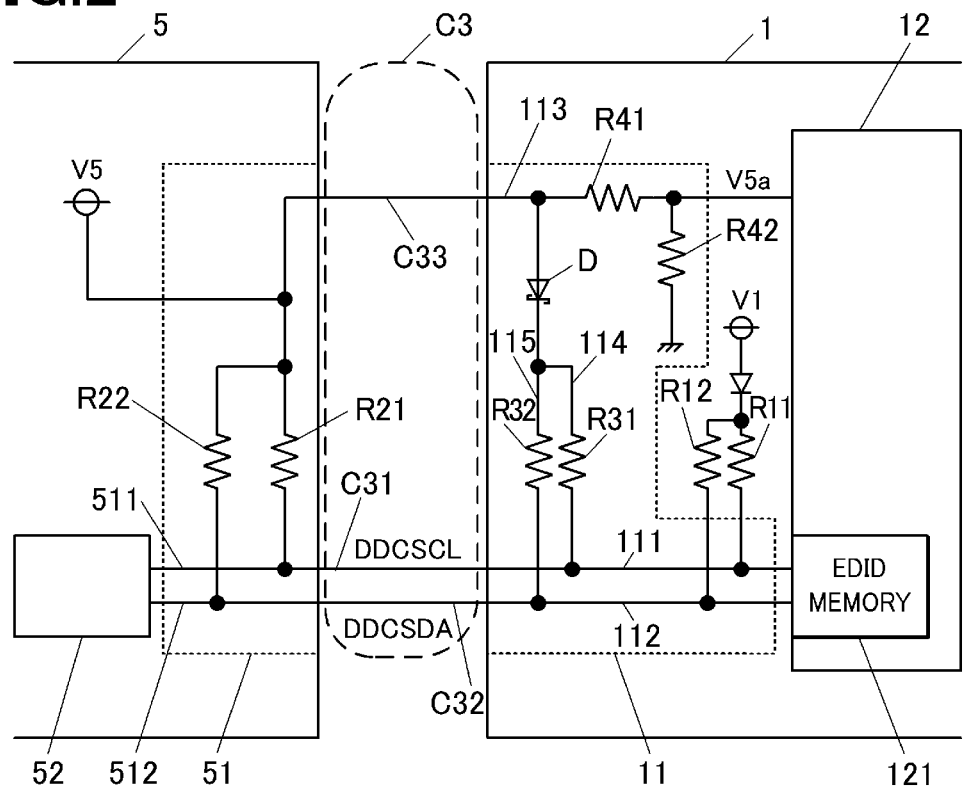
FIG. 2 is an illustration to explain the connection status of the projector and an image data output device.

FIG. 2 is an illustration to explain the connection status of the projector 1 and the image data output device 5. The HDMI cable C3 usually has a connector (connection terminal) having 19 pins, and 19 signal wires corresponding thereto transmit signals. Of these signal wires, twelve signal wires are for data of output images (including audio), two signal wires are DDC (Display Data Channel) signal wires C31, C32 (first signal wires or a pair of first signal wires) using I2C communication, and one signal wire is a signal wire C33 (second signal wire) that transmits an operating voltage V5 (+5 V) in accordance with operation of the image data output device 5.

The projector 1 includes a signal wire connection section 11 and an HDMI receiver 12 (detector). One end of the HDMI cable C3 is connected to the HDMI receiver 12 via the signal wire connection section 11. The image data output device 5 includes a signal wire connection section 51 and an HDMI transmitter 52. The other end of the HDMI cable C3, which is the end opposite the abovementioned one end, is connected to the HDMI transmitter 52 via the signal wire connection section 51.

The signal wires C31, C32, which are two DDC signal wires, are used for I2C communication. Of these two, one is the signal wire C31 (DDCSCL) that transmits a clock signal(s), and the other is the signal wire C32 (DDCSDA) that transmits a data signal(s) as display identification information, for example, from the projector 1 to the image data output device 5. In this embodiment, when power is supplied from the image data output device 5 in the state in which the projector 1 and the image data output device 5 are connected to one another by the HDMI cable C3, the voltage(s) of the signal wires C31, C32 rises to the operating voltage +5 V (H level). Each device to which the HDMI cable C3 is connected switches between the H level and a ground level (L level) by open-drain control, and generates and outputs a data signal(s). In response to a request from the image data output device 5 as a master (source), the projector 1 as a slave (sink) transmits contents of EDID (Extended Display Identification Data) stored in a memory 121 of the HDMI receiver 12, in particular, device (projector) information, resolution, refresh rate and/or other information, to the image data output device 5.

To the signal wire C33, on the basis of the power supplied from the external power source P to the image data output device 5, the voltage V5 of a predetermined voltage value, +5 V (voltage value) in this embodiment, subjected to DC conversion at the time of operation of the image data output device 5 is input. In the signal wire connection section 51 of the image data output device 5, the power of this DC voltage V5 is input in parallel to wires 511, 512 via resistance elements R21, R22, the wires 511, 512 being connected to the signal wires C31, C32. Consequently, the signal wires C31, C32 are, in the state in which the projector 1 is connected to the image data output device 5, electrically connected to the signal wire C33 via the resistance elements R21, R22, respectively, in the image data output device 5.

In the signal wire connection section 11 of the projector 1, at the time of operation of the projector 1, a voltage V1 of a voltage value of +5 V, which is the same voltage value as that in the image data output device 5, is input in parallel from a DC operating voltage source (power source of the projector 1 (electronic device)) to wires 111, 112 (first connecting wires) respectively via resistance elements R11, R12 (first resistors) as pull-up resistors, the wires 111, 112 being respectively corrected to the signal wires C31, C32.

In a wire 113 (second connecting wire) of the signal wire connection section 11, the wire 113 being connected to the signal wire C33, a resistance element R41 is inserted in series, and also a resistance element R42 (second resistor) is disposed between the wire 113 and the ground plane. The input voltage from the signal wire C33 is divided with these resistance elements R41, R42, and a voltage V5a obtained thereby is input to the HDMI receiver 12. For example, if the ratio of the resistance value of the resistance element R41 to the resistance value of the resistance element R42 is 1:2, about 3.3 V of 5 V input from the signal wire C33 is input to the HDMI receiver 12.

This signal wire connection section 11 further includes wires 114, 115 (third connecting wires) that respectively connect the wire 113 to the wires 111, 112 in parallel. In the wire 114, a resistance element R31 (third resistor) is inserted, and in the wire 115, a resistance element R32 (third resistor) is inserted. Further, in the wires 114, 115, as shown in FIG. 2, a diode D is inserted to function as a rectifying element that interrupts the flow of a current from the wires 111, 112 to the wire 113 (equivalent to "ON/OFF operation" or "switching operation" described below). The diode D is, in this embodiment, a Schottky barrier diode to make a voltage drop smaller, the voltage drop being caused by the diode D when a current flows from the wire 113 to the wires 111, 112. Alternatively, the diode D may be a Zener diode or the like.

When detecting the voltage that accompanies start of operation of the image data output device 5 and is input via the signal wire C33, the HDMI receiver 12 accordingly starts operating, for example, to receive image data as an output target, to emit and project light thereof, and/or the like. The HDMI receiver 12 detects an operating voltage, for example, by comparing the input voltage to the HDMI receiver 12 from the wire 113 (output voltage from the side of the wire 113 opposite the side thereof connected to the signal wire C33) with a reference voltage (reference value) that is between the assumed voltage V5a and the ground voltage. The HDMI receiver 12 determines that the image data output device 5 connected to the HDMI cable C3 is in operation, when detecting the voltage V5a being the reference value or higher.

Further, the HDMI receiver 12 may be controlled by the controller 15, for example, in a power-saving mode (standby mode) in which only part of operation of the projector 1 including the operation to detect the voltage V5a is selectively performed and the other, such as operation of the controller 15 and operation of the light emitter 16, is suspended or stopped, to deactivate the power-saving mode when detecting the input voltage being the reference voltage or higher (on the basis of the detection result), thereby being in a state (normal mode) in which the HDMI receiver 12 can perform the operation to receive image data and the operation to output images (emit and project light).

As described above, in the case where the HDMI cable C3 is connected to the image data output device 5, the signal wires C31, C32 are electrically connected to the signal wire C33 in the image data output device 5. Hence, when the voltage V1 is applied to and accordingly power is supplied to the wires 111, 112 in the projector 1, the voltage V1 is transmitted via the resistance elements R11, R12, the resistance elements R21, R22, the signal wire C33 and the resistance element R41 to the HDMI receiver 12 even if the image data output device 5 is not in operation.

In the case where the voltage (V1) takes such a route, the input voltage to the HDMI receiver 12, for example, via the signal wire C31 is the voltage obtained by voltage dividing with the combined resistance (sum of the resistance values) of the resistance elements R11, R21, R41 and the resistance value of the resistance element R42. Usually, the resistance values of the resistance elements R21, R22 are each about equal to or higher than the resistance value of the resistance element R41 due to current limit or the like. With respect to these, the resistance values of the resistance elements R11, R12 are each set at a value sufficiently higher than the resistance value of the resistance element R41. This can sufficiently lower the input voltage to (i.e., voltage to be detected by) the HDMI receiver 12 to a value lower than the reference voltage, and hence reduce false detection of an operating voltage supplied from the voltage V1 power source as that supplied from the voltage V5 power source, or vice versa.

However, if the resistance values of the resistance elements R11, R12 are too high, signal following performance during DDC operation decreases. This makes reception of proper signals difficult. In this embodiment, the resistance values of the resistance elements R31, R32 are set such that the combined resistance(s) of the resistance element(s) R31, R32, which are related to power supply from the voltage V5 power source, and the resistance element(s) R11, R12, which are related to power supply from the voltage V1 power source, satisfies the condition of the communication standard of I2C signals and accordingly becomes about equal to the original/conventional resistance value(s) of the resistance element(s) R11, R12.

Consequently, in the absence of application of the voltage V5, the voltage V5a having taken the abovementioned route is sufficiently low, and, thanks to the diode D, not increased by the voltage V1 via the wires 114, 115. In addition, the voltages of the signal wires C31, C32 can be prevented from becoming intermediate voltages. In the presence of application of the voltage V5, the voltage is applied with pull-up resistors in the conventional manner, and I2C communication is performed normally.

[Modifications]

Figure 3:
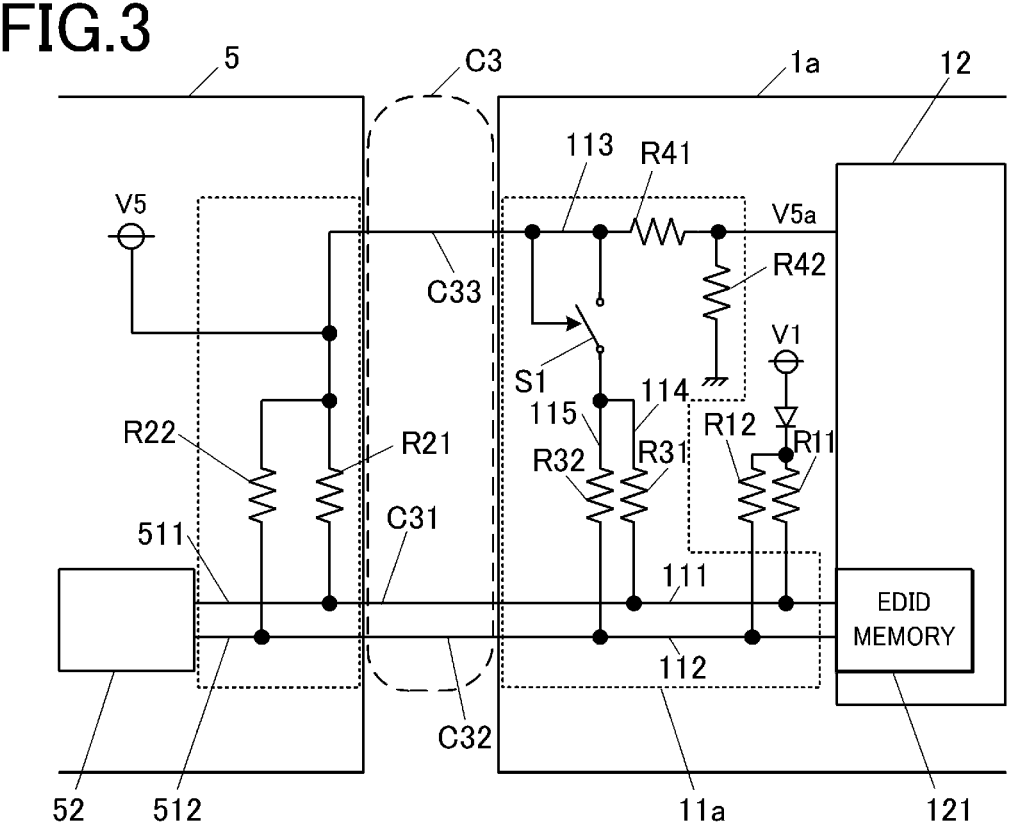
FIG. 3 is an illustration to explain the connection status of a projector of a first modification and the image data output device.

Modifications of the signal wire connection section 11 of the projector 1 will be described. FIG. 3 is an illustration to explain the connection status of a projector 1a including a signal wire connection section 11a of a first modification and the image data output device 5.

The signal wire connection section 11a of the first modification includes a switching element S1 as a rectifying element, instead of the diode D. The other components of the projector 1a are the same as those of the projector 1, and hence their descriptions will be omitted with the same reference signs given to the same components.

The switching element S1 performs ON/OFF operation according to the voltage of the wire 113. In this modification, the switching element S1 is ON and conducts electricity when the input voltage thereto is equal to or higher than a reference. The reference is set such that the switching element S1 is ON or OFF depending on presence or absence of power supply from the voltage V5 power source. That is, the reference is set such that the switching element S1 is ON when power is supplied from the voltage V5 power source and the voltage of the wire 113 is sufficiently high, and the switching element S1 is OFF when power is not supplied from the voltage V5 power source, no matter whether power is supplied from the voltage V1 power source, and also the switching element S1 switches between ON and OFF substantially in sync with the HDMI receiver 12. In this modification, the input of the voltage based on which the switching element S1 is ON or OFF is positioned closer to the side connected to the signal wire C33, as compared with the resistance element R41. Hence, the reference may be set at a value higher than the abovementioned reference voltage for the HDMI receiver 12 by the amount of a voltage drop that is caused by the resistance element R41.

Thus, behavior of the switching element S1 as a rectifying element is substantially identical with that of the diode D as a rectifying element. Further, since the switching operation of the switching element S1 is performed on the basis of the voltage of the wire 113, it is unnecessary to generate and input a control signal or the like therefor. Accordingly, time, effort and power consumption do not increase for such a control process.

Figure 4:
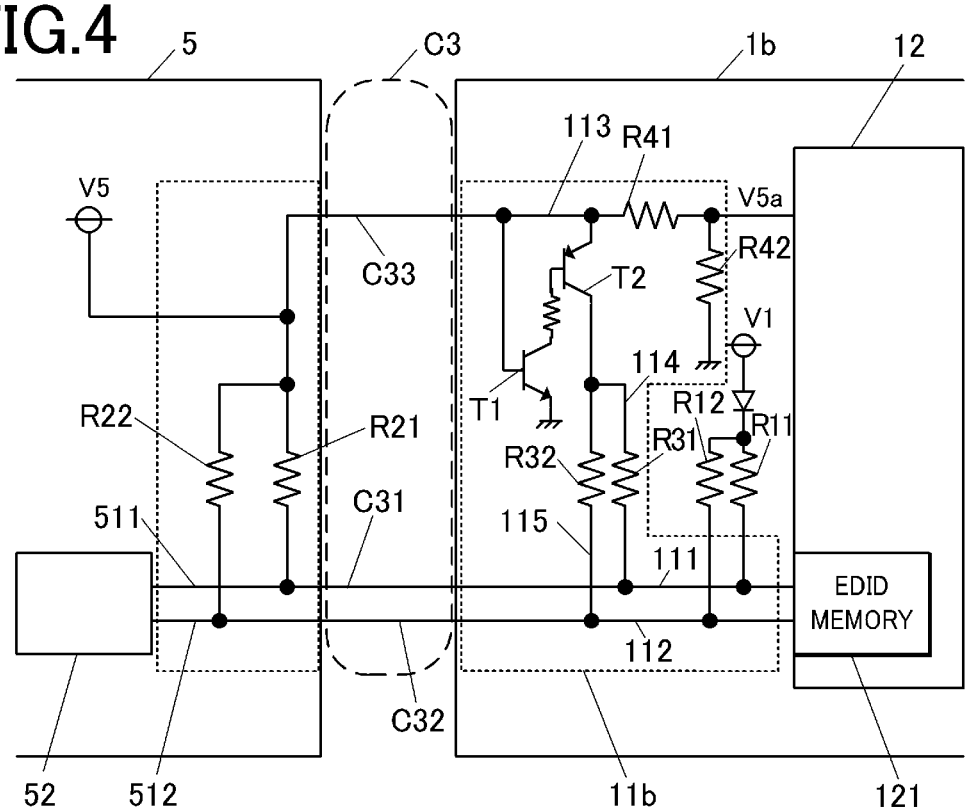
FIG. 4 is an illustration to explain the connection status of a projector of a second modification and the image data output device.

FIG. 4 is an illustration to explain the connection status of a projector 1b including a signal wire connection section 11b of a second modification and the image data output device 5. The signal wire connection section 11b of the second modification uses two transistors T1, T2 in combination as a rectifying element, instead of the switching element S1. In this modification, the emitter of the pnp transistor T2 is connected to the wire 113, and the collector thereof is connected to the resistance elements R31, R32. The base of the pnp transistor T2 is connected to the collector of the npn transistor T1 via a resistor. The emitter of the npn transistor T1 is grounded, and the base thereof is connected to the wire 113.

By this configuration, when the voltage of the wire 113 is equal to or higher than a threshold voltage for the transistor T1, the base current of the transistor T1 flows, which generates the collector current of the transistor T1, generates the base current of the transistor T2, and generates the collector current of the transistor T2, so that a current flows between the wire 113 and the wires 111, 112. When the voltage of the wire 113 is lower than the threshold voltage for the transistor T1, no such currents are generated, so that no current flows between the wire 113 and the wires 111, 112. That is, the resistance values of the resistance elements R11, R12 are set such that the input voltage to the base of the transistor T1 with the current that flows into the wire 113 by taking the aforementioned route from the voltage V1 power source to the wire 113 via the signal wires C31 to C33 is lower than the threshold voltage.

That is, as in the case where the diode D is used and the case where the switching element S1 is used, in this case too, where the transistors T1, T2 are used in combination, this combination of the transistors T1, T2 performs ON/OFF operation, namely, switching operation, according to the voltage of the wire 113.

As described above, the projector 1 as the electronic device of the above embodiment or the like includes: the wires 111, 112 to which the signal wires C31, C32 are respectively connected, the signal wires C31, C32 transmitting a clock signal(s) and a data signal(s) (first signals), respectively, between the projector 1 and the image data output device 5 as the external device; the resistance elements R11, R12 disposed between the wires 111, 112 and the operating voltage source (voltage V1) of the projector 1 (electronic device); and the wire 113 to which the signal wire C33 is connected, the signal wire C33 transmitting, to the projector 1, a voltage signal(s) (second signal) indicating the power supply status in the image data output device 5. The signal wires C31, C32 are, in the state in which the projector 1 is connected to the image data output device 5, electrically connected to the signal wire C33. The resistance values of the resistance elements R11, R12 are set such that the output voltage from the signal wire C33 is lower than the reference value when the voltage V1 of the operating voltage source is input to the signal wire C33 via the signal wires C31, C32 and the image data output device 5 in the state in which the projector 1 is connected to the image data output device 5 and no power is supplied in the image data output device 5. The resistance values of the resistance elements R11, R12 each being set at a value higher than the conventional one enable the HDMI receiver 12 of the projector 1 to avoid false detection of power as being supplied from the image data output device 5, which conventionally happens by the current flowing from the signal wires C31, C32 to the signal wire C33 via the image data output device 5 when the image data output device 5 is not in operation owing to the wiring for signals in the image data output device 5. Accordingly, the projector 1 can reduce malfunction resulting from such false detection.

Further, the wires 111, 112 are, in the state in which the projector 1 is connected to the image data output device 5, connected to the wire 113 by the signal wires C31, C32 being electrically connected to the signal wire C33 via the resistance elements R21, R22 of the image data output device 5. The current that takes the abovementioned route flows into the wire 113 with the voltage dropped by the resistance elements in the current path (route). Hence, the resistance values of the resistance elements R11, R12 each being set at a value higher than the conventional one can surely lower the output voltage of the wire 113. Accordingly, the projector 1 can reduce false detection of an operating voltage in the absence of power supply in the image data output device 5.

Further, the wire 113 is, in the state in which the projector 1 is connected to the image data output device 5, connected to the ground plane via the resistance element R42. That is, since there is a current flow path that includes the above-mentioned route of the current from the voltage V1 power source to the ground plane, the voltage is sufficiently dropped by the resistance elements R11, R12 before being input to the wire 113. Accordingly, the projector 1 can more surely reduce false detection of an operating voltage in the absence of power supply in the image data output device 5.

Further, the resistance element R42 is connected to the wire 113. Hence, the resistance element R42 having a proper resistance value in the signal wire connection section 11 of the projector 1, the proper resistance value being set with power consumption and partial resistance taken into account, enables input of a more accurate voltage signal to the HDMI receiver 12 with stable and proper current and voltage.

Further, the projector 1 includes the HDMI receiver 12 that detects whether the voltage input from the wire 113 (output voltage of the wire 113) is equal to or higher than the reference value. The wire 113 divides the input voltage from the signal wire C33 on the basis of the resistance element R42 (and the resistance element R41), and the HDMI receiver 12 detects the output voltage that is the voltage obtained by the voltage diving. The resistance values of the resistance elements R11, R12 are set such that the output voltage to be detected by the HDMI receiver 12 is lower than the reference value when the voltage of the voltage V1 operating voltage source is input to the wire 113 via the wires 111, 112 and the image data output device 5 in the state in which the projector 1 is connected to the image data output device 5 and no power is supplied from the image data output device 5 to the projector 1. The projector 1 can reduce false detection of an operating voltage supplied from the image data output device 5 in the case where a current could take the abovementioned route. This can reduce a problem, for example, that the image output system 100 does not start normally, even if the order of operation, such as connecting of the projector 1 to the image data output device 5 and start of power supply of each device, is incorrect.

Further, the projector 1 includes the wires 114, 115 that respectively connect the wires 111, 112 to the wire 113. The wires 114, 115 are respectively connected to the resistance elements R31, R32. Between the wire 113 and the wires 114, 115, the diode D is interposed as an electronic component that interrupts the current from the wires 111, 112 to the wire 113. The resistance value(s) of the resistance element(s) R31, R32 are set such that the combined resistance(s) of the resistance value(s) of the resistance element(s) R11, R12 and the resistance value(s) of the resistance element(s) R31, R32 satisfies the communication standard of data signals related to the I2C communication. Hence, as described above, the projector 1 can reduce malfunction resulting from the voltage (current) taking the abovementioned route, and also easily transmit (and receive) DDC signals as usual through the HDMI cable or the like.

Further, the signal wires C31, C32 are a pair of signal wires, and the resistance elements R11, R21, R31 and the resistance elements R12, R22, R32 are connected to the signal wires C31, C32 in parallel, respectively. That is, the signal wires C31, C32, which are two wires positioned in parallel for DDC signals, can be made to properly function, as with a single signal wire.

Further, the signal wires C31, C32 transmit I2C signals. In the signal wires C31, C32, which transmit signals generated by open drain lowering a voltage to the ground voltage, the voltages of the signal wires C31, C32 can be prevented from unintentionally becoming intermediate voltages and causing malfunction or problems. Also, the resistance values of pull-up resistors each being kept at a proper value can produce a proper waveform and enable transmission and reception of signals between the image data output device 5 and the projector 1 without trouble.

Further, the diode D is a Schottky barrier diode. This can make a voltage drop smaller, the voltage drop being caused when a current flows in the diode D.

Further, the projector 1 includes the controller 15 that links operation of the projector 1 with that of the image data output device 5 on the basis of the detection result by the HDMI receiver 12 about the power supply status in the image data output device 5. As described above, since the projector 1 (HDMI receiver 12) not falsely but accurately detects the voltage signal from the image data output device 5, the projector 1 can prepare for and start operating, for example, projecting an image, by accurately responding to the operation of the image data output device 5. Thus, convenience in the operation of the projector 1 can be higher.

The present disclosure is not limited to the above embodiment or the like, but can be modified in various respects. For example, as far as the HDMI receiver 12 can determine whether the image data output device 5 is in operation on the basis of the input voltage thereto, it may perform indirect comparison of the input voltage with the reference voltage.

Further, in the above embodiment or the like, the voltage V1 and the voltage V5 have the same voltage value. However, there is an HDMI receiver 12 that can deal with 3.3 V signals only. In such a case, the signal wire connection section 11 or the like may additionally include electronic components, electronic circuits and/or the like necessary therefor so that the HDMI receiver 12 can accurately determine, in this case too, whether power supply of the voltage V5 is present.

Further, in the above embodiment or the like, the signal wires C31 to C33 are part of the HDMI cable C3, but not limited thereto. The signal wires C31 to C33 may be part of another cable using DDC, such as a DVI cable, or may not even be signal wires to transmit I2C signals as far as the signal wires are configured in the same manner as the signal wires C31 to C33. In this case, not both but one of the signal wires C31, C32 may be connected to the signal wire 33.

Further, in the above embodiment or the like, the electronic device is the projector 1, but not limited thereto. The electronic device may be an image display device, such as a TV, an AV amplifier or the like. Alternatively, the electronic device may be a device that is irrelevant to image display but performs any other type(s) of operation, such as arithmetic processing and/or communication processing, in response to an input from an external device. Other specific components, configuration(s) thereof, contents and procedures of various types of processing operation, and so forth described in the above embodiment or the like can be appropriately modified without departing from the scope of the present disclosure.

Although some embodiments or the like of the present disclosure have been described, the scope of the present disclosure is not limited to the embodiments or the like described above, but includes the scope of the disclosure stated in claims below and its equivalents.

What is claimed is:
1. An electronic device comprising:
  a first connecting wire configured to be connectable to a first signal wire of a cable, the first signal wire of the cable transmitting a first signal between the electronic device and an external device that is connectable to the cable;
a first resistor disposed between the first connecting wire and a power source of the electronic device; and
a second connecting wire configured to be connectable to a second signal wire of the cable, the second signal wire of the cable transmitting a second signal from the external device to the electronic device,
wherein a resistance value of the first resistor is set such that an output voltage from the second connecting wire is lower than a reference value when a voltage of the power source is input to the second connecting wire via the first connecting wire and the external device in a state in which the first signal wire and the second signal wire are electrically connected to one another and the second signal is not input to the second signal wire from the external device.

2. The electronic device according to claim 1, wherein the resistance value of the first resistor is set such that the output voltage from the second connecting wire is equal to or higher than the reference value when the second signal is input to the second signal wire from the external device.

3. The electronic device according to claim 1, wherein the first connecting wire and the second connecting wire are electrically connected to one another in a state in which the electronic device is connected to the external device via the first signal wire and the second signal wire, and
wherein the first connecting wire and the second connecting wire are not electrically connected to one another in a state in which the electronic device is not connected to the external device.

4. The electronic device according to claim 1, further comprising a detector configured to detect the output voltage output according to a voltage input to the second connecting wire.

5. The electronic device according to claim 4, wherein the detector is configured to determine whether the output voltage is based on the second signal.

6. The electronic device according to claim 1, wherein the second connecting wire is grounded via a second resistor.

7. The electronic device according to claim 1, further comprising a second resistor connected to the second connecting wire.

8. The electronic device according to claim 1, further comprising:
a third connecting wire that connects the first connecting wire and the second connecting wire to one another; and
a rectifying element connected to the third connecting wire.

9. The electronic device according to claim 1, further comprising:
a third connecting wire that connects the first connecting wire and the second connecting wire to one another; and
a third resistor disposed between the third connecting wire and the first connecting wire.

10. The electronic device according to claim 9, wherein a resistance value of the third resistor is set such that a combined resistance of the resistance value of the first resistor and the resistance value of the third resistor satisfies a communication standard of the first signal.

11. The electronic device according to claim 1, wherein the first connecting wire transmits the first signal including at least one of a data signal and a clock signal.

12. An electronic device comprising:
a first connecting wire to which a first signal wire is connectable, the first signal wire transmitting a first signal between the electronic device and an external device;
a first resistor disposed between the first connecting wire and a power source of the electronic device;
a second connecting wire to which a second signal wire is connectable, the second signal wire transmitting a second signal from the external device to the electronic device;
a third connecting wire that connects the first connecting wire and the second connecting wire to one another; and
a rectifying element connected to the third connecting wire,
wherein the rectifying element does not pass a current from the first connecting wire to the second connecting wire when a voltage of the power source is input to the second connecting wire via the first connecting wire and the external device in a state in which the first signal wire and the second signal wire are electrically connected to one another and the second signal is not input to the second signal wire from the external device.

13. The electronic device according to claim 12, wherein the resistance value of the first resistor is set such that the output voltage from the second connecting wire is equal to or higher than the reference value when the second signal is input to the second signal wire from the external device.

14. The electronic device according to claim 12, wherein the first connecting wire and the second connecting wire are electrically connected to one another in a state in which the electronic device is connected to the external device via the first signal wire and the second signal wire, and
wherein the first connecting wire and the second connecting wire are not electrically connected to one another in a state in which the electronic device is not connected to the external device.

15. The electronic device according to claim 12, further comprising a detector configured to detect the output voltage output according to a voltage input to the second connecting wire.

16. The electronic device according to claim 15, wherein the detector is configured to determine whether the output voltage is based on the second signal.

17. The electronic device according to claim 12, wherein the second connecting wire is grounded via a second resistor.

18. The electronic device according to claim 12, further comprising a second resistor connected to the second connecting wire.

19. The electronic device according to claim 12, further comprising:
a third connecting wire that connects the first connecting wire and the second connecting wire to one another; and
a rectifying element connected to the third connecting wire.

20. The electronic device according to claim 12, further comprising:
- a third connecting wire that connects the first connecting wire and the second connecting wire to one another; and
- a third resistor disposed between the third connecting wire and the first connecting wire.

21. The electronic device according to claim 20, wherein a resistance value of the third resistor is set such that a combined resistance of the resistance value of the first resistor and the resistance value of the third resistor satisfies a communication standard of the first signal.

22. The electronic device according to claim 12, wherein the first connecting wire transmits the first signal including at least one of a data signal and a clock signal.

* * * * *